Aug. 21, 1962     E. E. SCHNELL     3,049,936

WORM GEARING

Filed June 20, 1960

*INVENTOR.*
ERNST E. SCHNELL

BY

R. C. Johnson

ATTORNEY

United States Patent Office 3,049,936
Patented Aug. 21, 1962

3,049,936
WORM GEARING
Ernest E. Schnell, West Bend, Wis., assignor to Deere & Company, Moline, Ill., a corporation of Delaware
Filed June 20, 1960, Ser. No. 37,221
2 Claims. (Cl. 74—458)

The present invention relates generally to agricultural implements and more particularly to drive gearing of the speed reduction type for driving certain relatively slow moving parts of an implement.

The object and general nature of this invention is the provision of a worm and worm gear drive for agricultural implements and the like in which a very inexpensive yet adequately satisfactory type of construction is provided. A further feature of this invention is the provision of a worm and worm gear drive mechanism that includes inherent spring cushion action.

More specifically, it is a feature of this invention to provide a worm and worm gear drive mechanism utilizing a simple and inexpensive generally cylindrical helical spring as the worm element, the spring having its coils spaced apart a distance sufficient to receive the teeth of the associated worm gear therebetween. Another feature of this invention is the provision of a drive mechanism employing a helical coil spring and complementarily notched stop collars, each of the latter receiving the adjacent end of the associated spring and fixed to the worm shaft for securing the helical coil spring to the shaft so as to serve to cause rotation of the shaft to drive the spring worm, the resiliency of the spring worm providing for adequate cushioning action to lessen the transmission of shocks or excessive impact loads between the driving and driven parts.

These and other objects and advantages of the present invention will be apparent to those skilled in the art after a consideration of the following detailed description, taken in conjunction with the accompanying drawings, in which.

Figure 1:
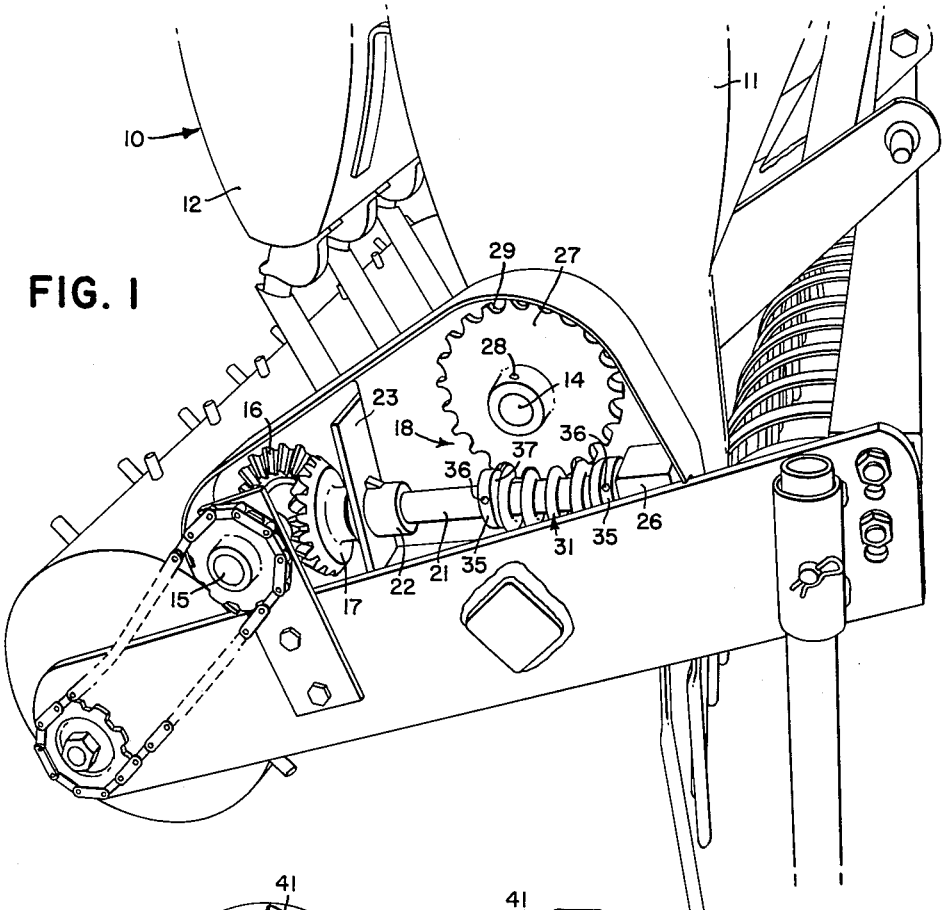
FIG. 1 is a fragmentary perspective view showing a portion of an agricultural implement in which the principles of this invention have been incorporated.
Figure 2:
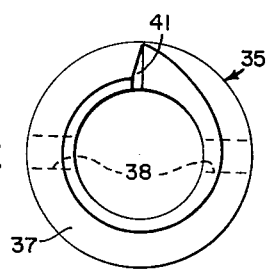
FIG. 2 is an enlarged face view of one of the spring-receiving stop collars.
Figure 3:
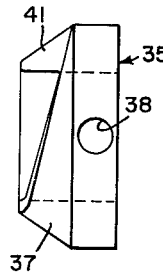
FIG. 3 is an edge view of the collar shown in FIG. 2.

Referring first to FIG. 1, for purposes of illustration the agricultural implement, indicated in its entirety by the reference numeral 10, is shown as a seed and fertilizer distributor having a first hopper 11 adapted to contain fertilizer and second hopper 12 adapted to contain seed. The hopper 11 includes agitator and other dispensing mechanism (not shown) connected to be actuated by a shaft 14 that extends axially outwardly of the housing to receive suitable drive means. In the machine shown, the shaft 14 is adapted to be driven from a jack shaft 15 by a pair of bevel gears 16 and 17 and worm gearing means 18 that form the principal portion of this invention.

The bevel gear 17 is secured to one end of the shaft 21, one end of which is supported by suitable bearing means 22 carried in a bracket 23 that is fixed to the implement frame in any suitable way. The opposite end of the shaft 21 is carried in a second bearing means 26 also fixed in any suitable way to the implement frame. A worm gear 27 is fixed, as by a roll pin 28 or the like, to the extended end of the distributor shaft 14, the gear 27 being of relatively simple construction, having teeth with generally semi-circular root portions, as indicated at 29. The gear 27 preferably is a casting.

Disposed on the shaft 21 is a generally cylindrical helical spring of circular cross section, indicated generally by the reference numeral 31. Each end of the spring is received in a notched portion 34 of the associated collar 35, the latter serving as means to fix the spring end to the shaft 21 so as to be held by the collar against rotation relative to the shaft in one direction. Each collar 35 is held in fixed relation to the shaft 21 by a roll pin 36 or other suitable means. The inner portion of each collar 35 is tapered, as at 37, to provide the necessary clearance for the teeth of the gear 27, whereby the collar 35 does not interfere with the free rotation of the gear 27. Each collar has openings 38 to receive the associated roll pin 36.

Figure 4:
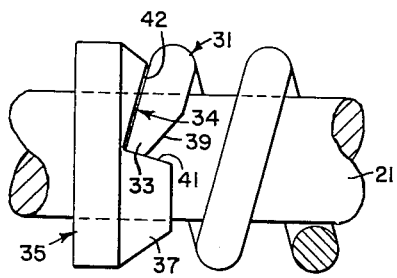
FIG. 4 is a fragmentary side view showing the stop collar with a spring seated in the notched portion of the collar.

As will best be seen from FIG. 4, the notched portion 34 is of particular construction. The end 33 of the spring, which is cut away at 39 for clearance, bears against a stop shoulder 41 at one end of the notch 34 and a spring seat 42 is of helical configuration and extends about half-way around the collar to receive the adjacent end of the spring 31.

The spring 31 is thus rigidly held to the shaft 21 by the two collars 35, the ends of the spring being thus held, while the intermediate portions of the spring are free to flex generally axially if sudden stresses or impact loads are imposed on the drive. The spring 35 forms a very inexpensive means for securing the equivalent of a worm for coaction with the worm gear 37 without requiring any grinding or other gear shaping operations to form the worm.

The gear 27, being a casting, is also relatively inexpensive. Furthermore, the spring 31 may easily and readily be replaced if it should become worn. All that it is necessary to do is to loosen one or both of the collars 35, take out the shaft, remove the spring 31 and replace it with a new one.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. Yieldable drive gearing of the speed reduction type comprising: a shaft; a driven gear; and a driving worm mounted about said shaft and meshing with said gear to drive said gear, said worm comprising a helical spring coaxially carried by the shaft and axially removable therefrom, said spring having opposite terminal ends, each end being a partial continuation of the helix of the spring and lying generally at an angle to a radial plane normal to the shaft axis and each end further having a terminal portion transverse thereto to provide a driving abutment, the coils of the spring being spaced apart so as to mesh with the teeth of said driven gear; and two substantially identical collars coaxially carried by the shaft and in facing relationship to each other respectively at opposite ends of the helical spring, each of said collars having a notch therein facing the respective end of the spring and shaped to conform to said end, each notch having one wall inclined at the aforesaid angle to seat against its spring end and another wall engaging the respective abutment in driving relation thereto, and releasable means cooperable between at least one collar and the shaft for removably securing said collar about the shaft, the parts being so arranged and constructed that rotation of the shaft in either direction causes the collars to drive the helical spring worm which will in turn cause the driven gear to be driven, intermediate portions of the helical spring worm being free to resiliently flex generally axially in response to certain stresses or impact loads imposed on the drive when the shaft is rotated in either direction.

2. The invention set forth in claim 1, further characterized by the inner end of each collar being tapered inwardly toward said spring about the entire periphery of said collar so that the innermost portion of said collar has a diameter smaller than that of the associated spring so as to provide clearance for the teeth of said worm gear, and the spring having an inner portion adjacent each terminal portion thereof cut away to form a cam surface for said driven gear, whereby the gear will be prevented from engaging the end of the spring.

References Cited in the file of this patent

UNITED STATES PATENTS

| | | |
|---|---|---|
| 871,227 | Ljungstrom | Nov. 19, 1907 |
| 1,231,643 | Parnall | July 3, 1917 |
| 1,436,072 | Allis | Nov. 21, 1922 |
| 1,492,266 | Ray | Apr. 29, 1924 |
| 2,012,028 | Twyman | Aug. 20, 1935 |
| 2,151,191 | Crane et al. | Mar. 21, 1939 |
| 2,312,189 | Petley | Feb. 23, 1943 |
| 2,635,479 | Uhertini | Apr. 21, 1953 |
| 2,682,176 | Fagley et al. | June 29, 1954 |
| 2,766,638 | Vice | Oct. 16, 1956 |
| 2,833,155 | Verhoeff | May 6, 1958 |

UNITED STATES PATENT OFFICE
CERTIFICATE OF CORRECTION

Patent No. 3,049,936                      August 21, 1962

Ernst E. Schnell

It is hereby certified that error appears in the above numbered patent requiring correction and that the said Letters Patent should read as corrected below.

In the grant, line 1, and in the heading to the printed specification, line 3, for "Ernest E. Schnell" read -- Ernst E. Schnell --.

Signed and sealed this 7th day of May 1963.

(SEAL)
Attest:

ERNEST W. SWIDER
Attesting Officer

DAVID L. LADD
Commissioner of Patents